(12) United States Patent
Khayrallah et al.

(10) Patent No.: US 8,798,215 B2
(45) Date of Patent: Aug. 5, 2014

(54) METRIC CORRECTIONS FOR DEMODULATORS USING SERIAL LOCALIZATION WITH INDECISION

(75) Inventors: Ali S. Khayrallah, Mountain View, CA (US); Dennis Hui, Sunnyvale, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 140 days.

(21) Appl. No.: 13/306,232

(22) Filed: Nov. 29, 2011

(65) Prior Publication Data
US 2013/0136210 A1  May 30, 2013

(51) Int. Cl.
*H04B 7/10* (2006.01)
(52) U.S. Cl.
USPC .......................................... 375/347; 455/132
(58) Field of Classification Search
USPC ........................................................ 375/347
See application file for complete search history.

(56) References Cited

U.S. PATENT DOCUMENTS

| | | | | |
|---|---|---|---|---|
| 5,905,743 A * | 5/1999 | Ramesh | ........................ | 714/795 |
| 6,272,660 B1 * | 8/2001 | Chen et al. | .................... | 714/794 |
| 7,685,501 B2 * | 3/2010 | Ito | ............................... | 714/780 |
| 8,457,254 B2 * | 6/2013 | Khayrallah | ................... | 375/340 |
| 2004/0064781 A1 * | 4/2004 | Kamada | ........................ | 714/795 |
| 2005/0286659 A1 * | 12/2005 | Abe et al. | ...................... | 375/341 |
| 2010/0232549 A1 * | 9/2010 | Oizumi | ......................... | 375/341 |
| 2011/0051851 A1 | 3/2011 | Khayrallah | | |
| 2011/0051852 A1 | 3/2011 | Khayrallah | | |
| 2011/0103528 A1 | 5/2011 | Khayrallah | | |
| 2012/0051463 A9 * | 3/2012 | Siti et al. | ........................ | 375/340 |
| 2012/0254192 A1 * | 10/2012 | Gelbard | ......................... | 707/745 |

OTHER PUBLICATIONS

Hui. D., et al., "Maximum Likelihood Sequence Estimation in the Presence of Constant Envelope Interference", Proc. IEEE VTC, Fall 2003, pp. 1-5.
Khayrallah, A, "SLIC—A Low Complexity Demodulator for MIMO", to appear in Proc. IEEE VTC, Fall 2011, pp. 1-5.

* cited by examiner

*Primary Examiner* — Santiago Garcia
(74) *Attorney, Agent, or Firm* — Coats and Bennett, P.L.L.C.

(57) ABSTRACT

Demodulation methods and apparatus for a multi-stage SLI demodulator are disclosed. Residual signals from each demodulation stage are modeled as finite sets of unresolved signals and a new metric is introduced for use in search of best candidate symbol estimates. The metric may be evaluated based on a probability distribution function of the residual signals or a probability mass function of the unresolved signals. The metric may also be approximated by the sum of a conventional Euclidean metric and a correction metric. The best candidate symbol estimates generated from each stage of the multi-stage SLI demodulator are summed to form cumulative symbol estimates.

20 Claims, 7 Drawing Sheets

METRIC CORRECTIONS FOR DEMODULATORS USING SERIAL LOCALIZATION WITH INDECISION

TECHNICAL FIELD

The present invention generally relates to demodulation in a Multiple-Input-Multiple-Output (MIMO) receiver and, more particularly, to joint demodulation of MIMO signals based on serial localization with indecision.

BACKGROUND

Relatively large modulation signal constellations such as 16-, 32-, and 64-QAM (Quandrature Amplitude Modulation) have been adopted in many wireless communications standards, such as EDGE (Enhanced Data Rates for GSM Evolution), HSPA (High Speed Packet Access), LTE (Long Term Evolution), and WiMax (Worldwide Interoperability for Microwave Access). Multiple Input-Multiple Output (MIMO) schemes employed by those standards create even larger modulation constellations.

A large modulation constellation increases the complexity of a demodulator. For example, the complexity of MLSE (Maximum Likelihood Sequence Estimation) demodulation increases exponentially with the size of the modulation constellation. Less complex solutions are available, for example, DFSE (Decision-Feedback Sequence Estimation), DFE (Decision-Feedback Equalization), etc. These solutions attempt to strike a balance between accuracy and complexity. Other techniques useful for demodulating signals in MIMO scenarios include Multi-Stage Arbitration (MSA) and Iterative Tree Search (ITS).

Serial Localization with Indecision (SLI) is a demodulation technique that approximates an MLSE demodulator with reduced complexity. The basic idea of SLI is to demodulate in a series of simpler stages, where each non-final stage attempts to localize the search for the benefit of the following stage. In the first stage, the symbol constellation is broken down into four overlapping subsets, and each subset is represented by its centroid. The first stage selects a subset and outputs the corresponding centroid as an intermediate symbol estimate. The use of centroid results in a residual signal that forms the input to the following stage. In the next stage, the selected subset is further broken down into four overlapping subsets and the process is repeated until the final stage is reached. Each non-final stage makes a choice among the reduced subsets and outputs an intermediate symbol estimates. The intermediate symbol estimates from each stage are summed to obtain the final symbol estimates. Indecision arises from representing the modulation constellation as overlapping subsets. Indecision is beneficial in a multi-stage structure, because indecision discourages an irreversible bad decision in an early stage.

In a SLI receiver, the residual signals from each stage are generally modeled as Gaussian noise. This is so for the following reasons. First, a Gaussian noise model is already used to model the internal noise of the receiver and it is natural to extend that model to other noise sources, such as residual signals. Second, the Gaussian noise model is a worst case noise model, therefore, is robust. Third, the Gaussian noise model is a well-understood model, for which the optimal processing is relatively simple and the appropriate metric is the familiar Euclidean metric. Nevertheless, the Gaussian model is not an accurate match for the discrete residual signal, especially when the number of data samples is small.

Accordingly, there remains a need to develop modulation techniques that account for the discrete nature of the residual signals in order to improve the performance of SLI demodulators.

SUMMARY

Exemplary embodiments of the present invention provide methods and apparatus for demodulation in a SLI receiver. Rather than modeling residual signals from each demodulation stage as Gaussian noise, a probability density function for the residual signals is incorporated into the computation of the likelihood metric used for selecting best candidate symbol estimates.

At each stage, input symbols corresponding to multiple data streams are received along with a corresponding reduced symbol constellation. A set of candidate sequences is generated from symbols in the symbol constellation. For this set of candidate sequences, the corresponding finite set of unresolved signals is derived and a likelihood metric for each candidate sequence is computed based on the input symbols and a probability mass function for the unresolved signals. The output symbol estimates from each stage are selected from the set of candidate sequences based on the likelihood metrics. The output symbol estimates from each stage are then summed to create cumulative symbol estimates.

A demodulator implementing the improved SLI demodulation technique is also disclosed. The demodulator includes an input, a candidate symbol generator, a likelihood estimator, and a selector. The input is configured to receive input symbols corresponding to multiple data streams and a symbol constellation. The candidate symbol generator is configured to generate a set of candidate sequences from symbols in the symbol constellation. For this set of candidate sequences, the candidate symbol generator also generates a finite set of unresolved signals. The likelihood estimator is configured to compute a likelihood metric for each candidate sequence based on the input symbols and a probability mass function for the unresolved signals. The selector is configured to select a best candidate sequence from the set of candidate sequences as output symbol estimates based on the likelihood metrics computed for the set of candidate sequences.

DETAILED DESCRIPTION

Figure 1:
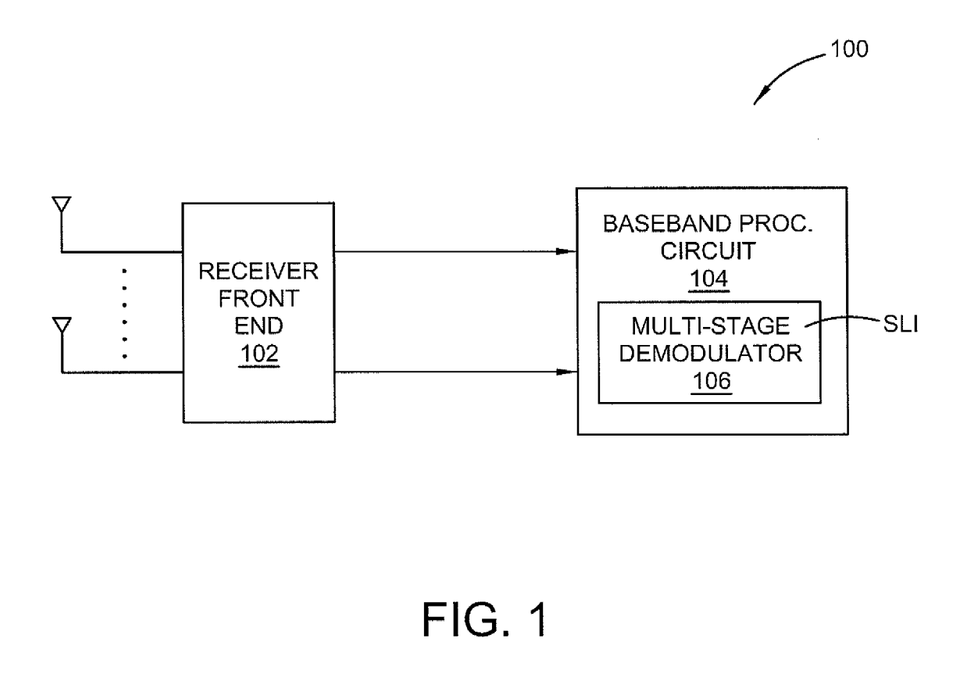
FIG. 1 illustrates a block diagram of a receiver including a multi-stage SLI demodulator and a constellation processing module.

FIG. 1 illustrates an exemplary receiver 100. The receiver 100 comprises a receiver front end circuit 102 coupled to one or more receive antennas 108 and baseband processing circuits 104. The baseband processing circuits 104 comprise one or more processors, hardware, firmware, or a combination thereof, for processing the received signals. The baseband processing circuits 104 include a multi-stage SLI demodulator 106. As described above, a SLI demodulator is a reduced complexity demodulator. A SLI demodulator includes a serial structure with a joint processing unit at each stage.

Figure 2:
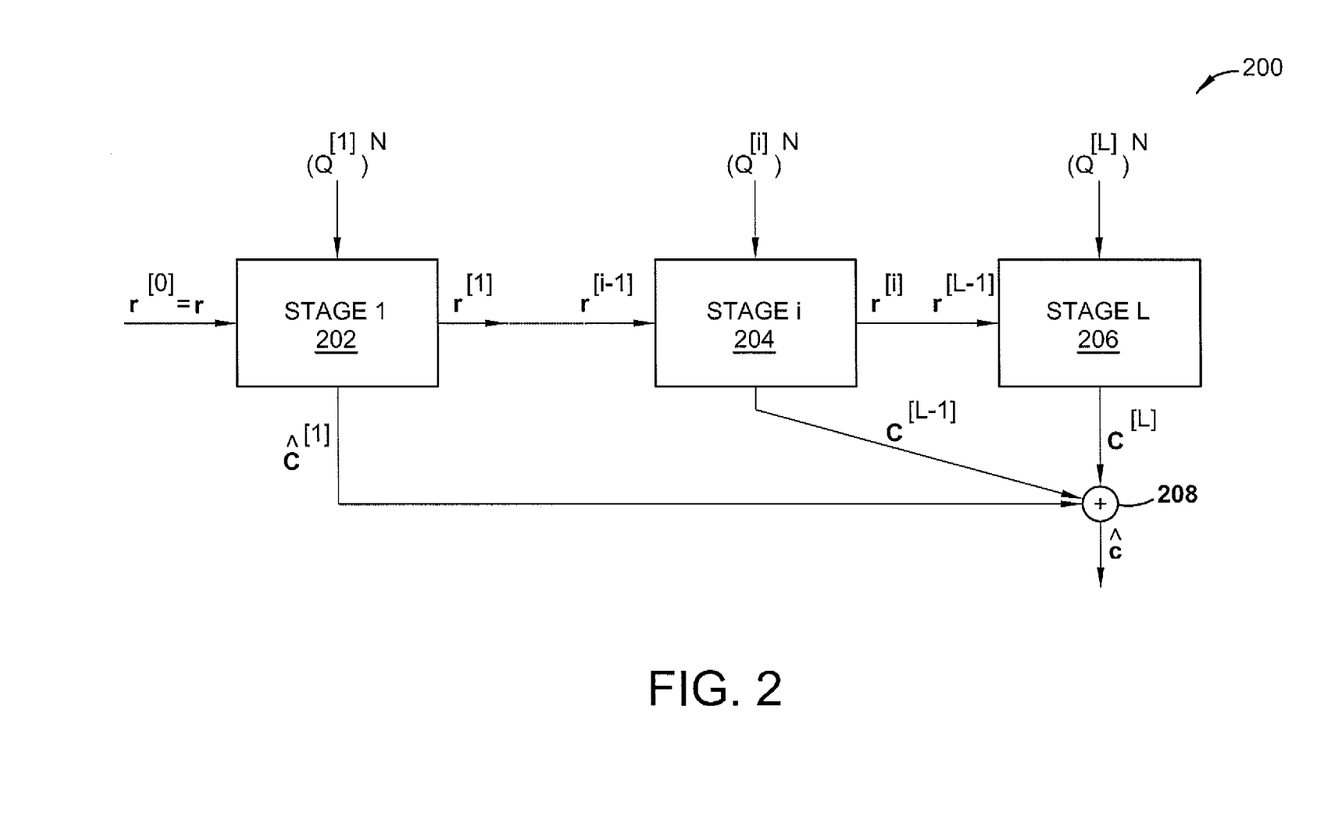
FIG. 2 illustrates a multi-stage SLI demodulator.
Figure 3:
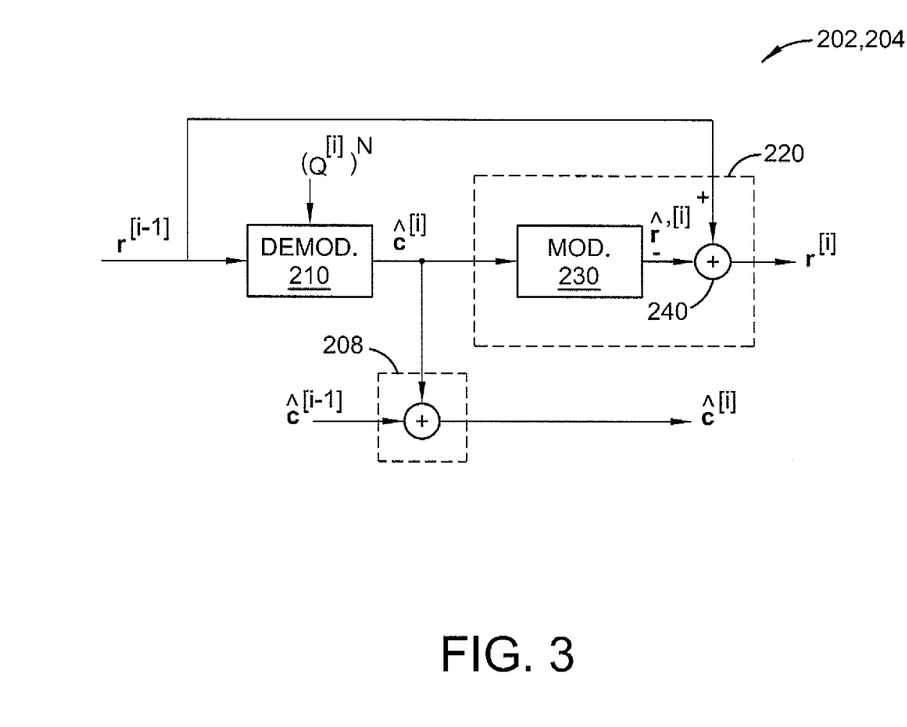
FIG. 3 illustrates an embodiment of one stage of a multi-stage SLI demodulator.

FIGS. 2 and 3 illustrate an exemplary embodiment of a SLI demodulator 200. The SLI demodulator 200 includes one or more preliminary stages 202-204, and a final stage 206. The SLI demodulator 200 processes the received signal $\hat{r}^{[1]}$ in stages and outputs the best candidate ĉ for the transmitted signal. The demodulation units 210 (shown in FIG. 3) in each stage are Maximum Likelihood Sequence Estimation (MLSE) demodulators with a reduced state trellis. As will be described in greater detail below, the demodulation units 210 in the preliminary stages 202-204 of the SLI demodulator 200 use centroids rather than symbols in the transmit symbol constellation for demodulation. The use of centroids for demodulation results in an unresolved signal that serves as the input to the next stage, where it is resolved further. The demodulation unit 210 in the final stage 206 of the SLI demodulator 200 uses a reduced state trellis based on a subset of the original symbol constellation. The demodulation units 210 in each stage 202-206 generate intermediate estimates. A combiner 208 adds the intermediate estimates produced in each stage 202-206 symbol-by-symbol to produce the final estimate.

FIG. 3 illustrates the main functional components in one stage 202-206 of the SLI demodulator 200. The demodulation unit 210 in each stage uses an effective symbol constellation $(Q^{[i]})^N$ derived from the true symbol constellation $(Q)^N$. The superscript i represents the sequence number of the stage. The demodulation unit 210 in each stage 202-206 receives a corresponding input signal $\hat{r}^{[i-1]}$ and demodulates the input signal $\hat{r}^{[i-1]}$ using a symbol constellation $(Q^{[i]})^N$ to generate intermediate estimates $\hat{c}^{[i]}$. The preliminary stages 202-204, further include a signal generation circuit 220 to generate the input signal $\hat{r}^{[i]}$ to the following stage. The signal generation circuit 220 includes a modulator 230 to modulate the symbols in the intermediate estimate $\hat{c}^{[i]}$ and a combiner 240 to subtract the modulated symbols from corresponding symbols in $\hat{r}^{[i-1]}$ to generate an input to the next stage. The final stage 206 does not need a signal generation circuit 220. A combiner 208 adds the intermediate estimates $\hat{c}^{[i]}$ produced from each stage 202-206 to produce the final sequence estimate ĉ.

The SLI equalization technique is described in U.S. patent application Ser. No. 12/572,692 filed Nov. 2, 2009 titled "Method for Equalization and Whitening of ISI using SLI," U.S. patent application Ser. No. 12/549,143 filed Aug. 27, 2009 titled "Equalization using Serial Localization with Indecision," and "U.S. patent application Ser. No. 12/760,839 filed Apr. 15, 2010 titled "Channel Estimation For Equalizer Using Serial Localization With Indecision." Each of these pending applications is incorporated herein in its entirety by reference.

To understand how a SLI demodulator works, consider an N×N MIMO signal received over a non-dispersive channel. The received signal $r=(r_1, \ldots, r_N)^T$ can be expressed as:

$$r = Hc + n \quad (1.1),$$

where c is a N×1 vector representing the transmitted signals given by $c=(c_1, \ldots, c_N)_T$, H is an N×N matrix representing the channel response, and n is a N×1 vector representing white Gaussian noise. A full joint detector is the optimal receiver in this scenario.

With a symbol constellation Q of size q for each stream of signals, there are a total of $q^N$ possible candidates $\bar{c}=(\bar{c}_1, \ldots, \bar{c}_N)^T$ for r. A full joint detector (JD) searches over all $q^N$ candidates $\bar{c}$ in the space $Q^N$ to find the one that minimizes the following metric:

$$D(\bar{c}|r,R) = (r - H\bar{c})^H R^{-1} (r - H\bar{c}) \quad (1.2).$$

The best candidate is denoted $\hat{c} = (\hat{c}_1, \ldots \hat{c}_N)^T$. The superscript H indicates Hermitian or conjugate transpose.

When the effective constellation of r is large, searching for the best candidate ĉ, becomes very complex. A SLI receiver 100 reduces the computational complexity by representing the transmitted symbols as a series of approximations, which are estimated in a sequence of stages. In a L-stage SLI receiver 100, the transmitted symbol vector is represented as:

$$\hat{c} = \hat{c}^{[1]} + \ldots + \hat{c}^{[L]} \quad (1.3).$$

Each stage i detects a component $\hat{c}^{[i]}$ am using an effective symbol constellation $Q^{[i]}$ derived from the true symbol constellation $Q^{[i]}$. The components are then added to obtain the final estimate of the candidate ĉ.

At the first stage 202, for each stream of the transmitted signal, the symbol constellation Q is approximated by a set of centroids, $Q^{[1]}$, of size $q^{[1]}$. Each centroid in $Q^{[1]}$ represents a subset of Q. The union of the subsets is equal to the symbol constellation Q. The subsets overlap one another, which produces indecision. In a preferred design approach, all the subsets are a shifted version of the same set $O^{[1]}$ of size $o^{[1]}$ with centroid equal to 0. In general, the subsets need not be shifted versions of the same set, nor do they even need to have the same size.

Figure 4:
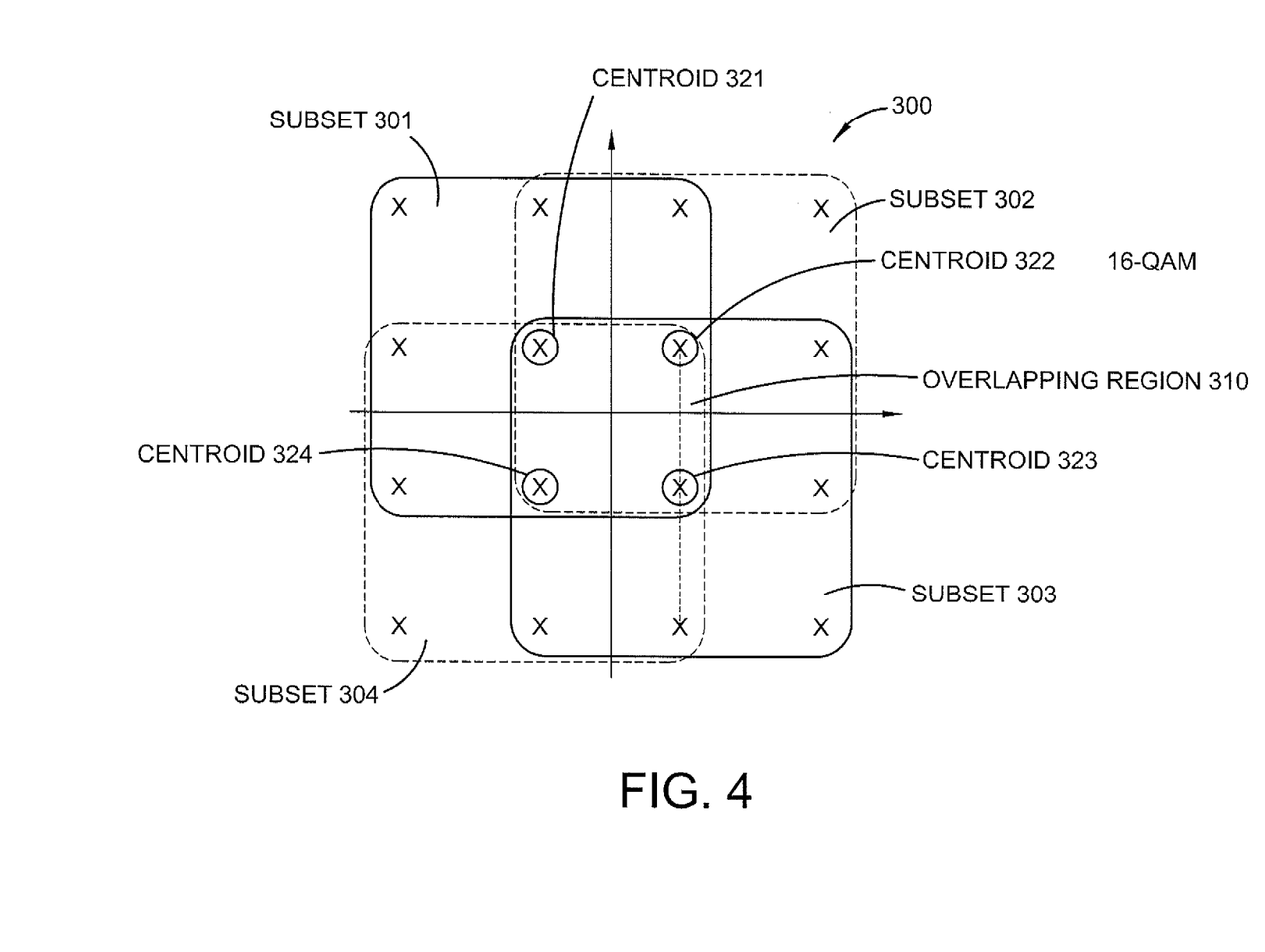
FIG. 4 illustrates a 16-QAM constellation and four overlapping SLI subsets.

FIG. 4 illustrates a 16-QAM constellation Q of size 16 that is divided into four subsets, 301-304. Each of the four subsets 301-304 is a shifted version of $O^{[1]}$, a 9-QAM constellation of size 9 with a centroid equal to 0. The union of the four subsets 301-304 equals the constellation Q. The four subsets also form an overlapping region 310. Each subset is represented by a centroid shown as a circle. For example, subset 301 is represented by centroid 321, subset 302 is represented by centroid 322, subset 303 is represented by centroid 323, and subset 304 is represented by centroid 324. The set of centroids, {321, 322, 323, 324}, forms constellation $Q^{[1]}$, which is a 4-QAM constellation. $Q^{[2]}$ is the same as $O^{[1]}$ and is also a 9-QAM constellation.

Figure 5:
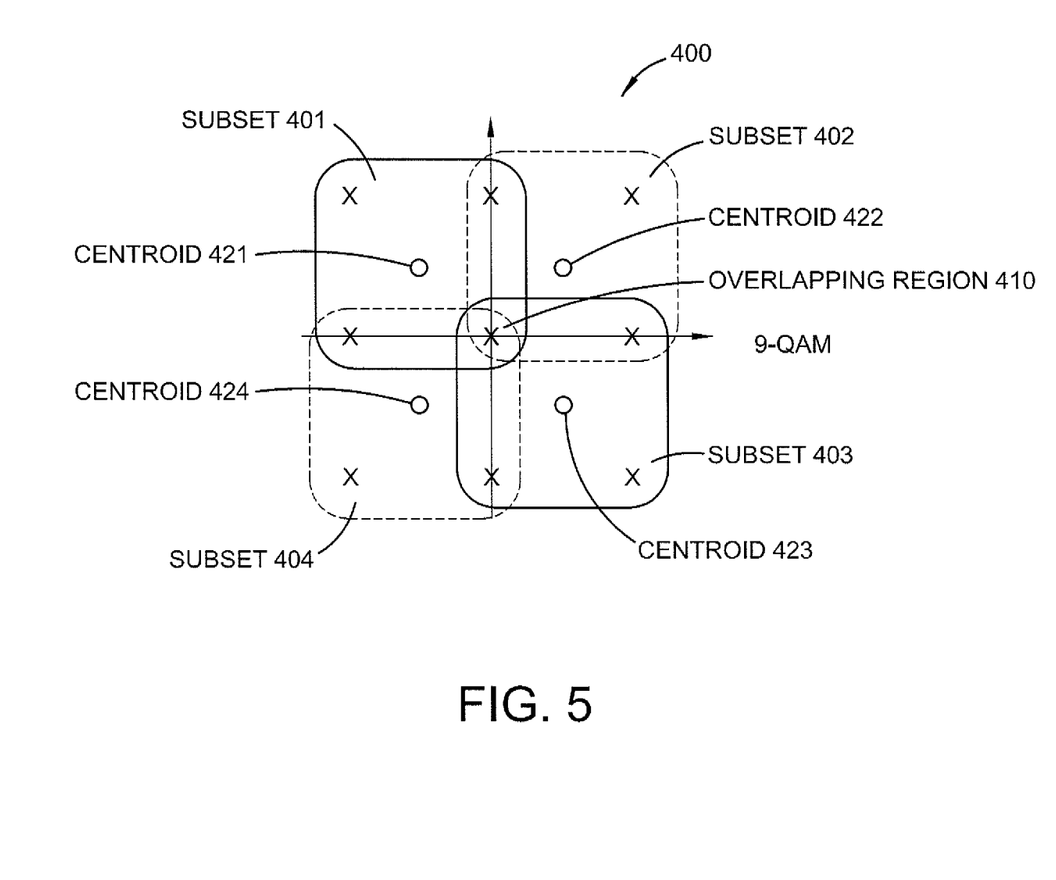
FIG. 5 illustrates a 9-QAM constellation and four overlapping SLI subsets.

FIG. 5 illustrates the constellation $O^{[1]}$ being divided further into four subsets 401-404. Each of the four subsets 401-404 is a shift version of $O^{[2]}$, a 4-QAM constellation of size 4 with centroid equal to 0. The union of the four subsets 401-404 equals the constellation $Q^{[2]}$. The four subsets 401-404 also form an overlapping region 410. The process continues for the next stage. For example, the constellation input to the demodulator unit 210, $Q^{[3]}$, may be set to be $O^{[2]}$.

The input to stage i of the SLI receiver is $\hat{r}^{[i-1]}$, which is derived at stage (i−1). The input at stage 1 is the received signal. In the stages prior to stage i, the best candidate symbol estimates, $\hat{c}^{[1]} \ldots \hat{c}^{[i-1]}$, have already been determined. At stage i, the SLI receiver searches for the best candidate symbol $c^{[i]}$. The unresolved signal $b^{[i]}$ from stage i can be expressed as:

$$b^{[i]} = (c^{[i+1]} + \ldots + c^{[L]}) \quad (1.4).$$

The unresolved signal $b^{[i]}$ belongs to the constellation subset $O^{[i]}$. In some implementations, the remodulated unresolved signal, after being filtered by the channel, can be modeled as colored Gaussian noise. The remodulated unresolved signal can be expressed as $Hb^{[i]}$, with H being the channel response estimate. The covariance of the filtered unresolved signal can be expressed as:

$$\epsilon^{[i]} HH^H \quad (1.5),$$

where $\epsilon^{[i]}$ is the average energy of the set $O^{[i]}$. Note that $\epsilon^{[i]}$ decreases as the stage index i increases, since there is less and less transmitted signal unaccounted for in the demodulation process. The total noise has a covariance $R^{[i]}$ given by:

$$R^{[i]} = \epsilon^{[i]} H H^H + R \qquad (1.6).$$

Referring again to FIG. 3, the demodulation unit 210 conducts a full joint detection search over the constellation $(Q^{[i]})^N$ for N streams of received signals at the same time. It searches over all $(q^{[i]})^N$ candidates $\bar{c}^{[i]}$ in the effective constellation $(Q^{[i]})^N$ for the best candidate symbol estimates that minimize the metric $$D(\bar{c}^{[i]} | r^{[i-1]}, R^{[i]}) = (r^{[i-1]} - H\bar{c}^{[i]})^H (R^{[i]})^{-1} (r^{[i-1]} - H\bar{c}^{[i]}) \qquad (1.7).$$

The metric in Equation (1.6) is derived from Equation (1.2) by replacing R with $R^{[i]}$, and r with the modified receiver vector $r^{[i-1]}$. The best candidate symbol estimates $\hat{c}^{[i]}$ are output by the demodulation unit 210 as intermediate estimates.

The modulation unit 230 modulates the decisions $\hat{c}^{[i]}$ by computing $H\hat{c}^{[i]}$. The reconstructed signal $\hat{r}^{[i]} = H\hat{c}^{[i]}$ is subtracted from the input signal $\hat{r}^{[i-1]}$ to stage i, to produce signal $\hat{r}^{[i]}$, which is the input signal to the next stage, stage i+1. In some embodiments, output $\hat{c}^{[i]}$ can be also used as pilot symbols $\hat{p}^{[i-1]}$ for channel estimation.

As described above, the unresolved signals from each stage are generally modeled as Gaussian noise. But a Gaussian model is not an accurate match for the discrete unresolved signals. More accurate models can be constructed to take into consideration the characteristics of the unresolved signals, which are discrete and belong to a finite set.

For example, in the case of a receiver 100 with a single received signal, $O^{[i]}$ is a 9-QAM constellation shown in FIG. 5. For each candidate symbol in $O^{[i]}$, there leaves corresponding unresolved signal. When the constellation is a 9-QAM constellation, there are nine candidate symbols for each stream and therefore nine corresponding unresolved signals. In the case of a 2×2 MIMO receiver, where there are two input streams, there will be 9×9=81 unresolved signals. The knowledge that there are only a finite number of unresolved signal sets can be relied on to boost the performance of a SLI receiver, as explained below.

The effective received signal $r^{[i-1]}$ at the input to stage i can be modeled as:

$$r^{[i-1]} = Hc^{[i]} + \underbrace{(Hb[i] + n)}_{v^{[i]}}, \qquad (1.8)$$

where $b^{[i]} \in (O^{[i]})^N$ is the unresolved signal, and $v^{[i]}$ denotes the sum of the remodulated unresolved signal and noise. If we model $b^{[i]} = [b_1^i, b_2^i, \ldots b_N^i]^T$ as a random vector from $(O^{[i]})^N$ with a certain probability mass function:

$$\rho_{b^{[i]}}(b) \equiv \text{Prob}(b^{[i]} = b) \qquad (1.9).$$

Then the probability density function (pdf) of $v^{[i]}$ can be written as a convolution:

$$\rho_{v^{[i]}}(v) = \sum_{b \in (O^{[i]})^N} \rho_{b^{[i]}}(b) \rho_n(v - Hb), \qquad (1.10)$$

where $\rho_n(n)$ is the probability density function of the noise n, and b is an unresolved signal from the finite set $(O^{[i]})^N$. Since n is Gaussian with covariance R, Equation (1.10) can be rewritten as:

$$\rho_{v^{[i]}}(v) = \frac{1}{\pi^N \det(R)} \sum_{b \in (O^{[i]})^N} \rho_{b^{[i]}}(b) \exp\{-(v - Hb)^H R^{-1} (v - Hb)\}. \qquad (1.11)$$

Note that for the case in which $v^{[i]}$ is modeled as Gaussian noise with covariance $R^{[i]}$, the probability density function of $v^{[i]}$ is given by:

$$\rho_{v^{[i]}}(v) = \frac{1}{\pi^N \det(R^{[i]})} \exp\{-v^H (R^{[i]})^{-1} v\}. \qquad (1.12)$$

Equation (1.12) can be transformed as follows when function $-\ln(\ )$ is taken on both sides of Equations (1.12):

$$-\ln(\rho_{v^{[i]}}(v)) = v^H (R^{[i]})^{-1} v + \ln(\pi^N \det(R^{[i]})) \qquad (1.13).$$

When evaluated at candidate $\bar{c}^{[i]}$, the noise term v becomes $$v = r^{[i-1]} - H\bar{c}^{[i]} \qquad (1.14).$$

and (1.13) becomes $$-\ln(\rho_{v^{[i]}}(r^{[i-1]} - H\bar{c}^{[i]})) = (r^{[i-1]} - H\bar{c}^{[i]})^H (R^{[i]})^{-1} (r^{[i-1]} - H\bar{c}^{[i]}) + \ln(\pi^N \det(R^{[i]})) \qquad (1.13).$$

This expression coincides with the metric $D(\bar{c}^{[i]} | r^{[i-1]}, R^{[i]})$, the Euclidean metric of stage i in the original SLI, except for the constant term $\ln(\pi^N \det(R^{[i]}))$ which can be ignored.

Similarly, if function $-\ln(\ )$ is taken on both sides of Equation (1.11), a new metric can be defined as follows:

$$D_{new}(\bar{c}^{[i]} | r^{[i-1]}, R) \equiv -\ln(\rho_{v^{[i]}}(r^{[i-1]} - H\bar{c}^{[i]})) \qquad (1.15)$$

$$= -\ln\left[\sum_{b \in (O^{[i]})^N} \rho_{b^{[i]}}(b) \exp\{-(r^{[i-1]} - H\bar{c}^{[i]} - Hb)^H R^{-1} (r^{[i-1]} - H\bar{c}^{[i]} - Hb)\}\right]$$

$$-\ln(\pi^N \det(R))$$

The second term in Equation (1.14), $\ln(\pi^N \det(R))$, can be ignored because it is a constant. The first term in Equation (1.14) can be re-written as the sum of the conventional Euclidean metric $D(\bar{c}^{[i]} | r^{[i-1]}, R)$ and a correction term, namely $$D_{new}(\bar{c}^{[i]} | r^{[i-1]}, R) = D(\bar{c}^{[i]} | r^{[i-1]}, R) + \Delta(\bar{c}^{[i]} | r^{[i-1]}, R) \qquad (1.16),$$

where the correction term $\Delta(\bar{c}^{[i]} | r^{[i-1]}, R)$ is defined as:

$$\Delta(\bar{c}^{[i]} | r^{[i-1]}, R) \equiv \qquad (1.17)$$

$$-\ln\left[\sum_{b \in (O^{[i]})^N} \rho_{b^{[i]}}(b) e^{-b^H H^H R^{-1} Hb} \exp\{2\text{Re}\{(r^{[i-1]} - H\bar{c}^{[i]})^H R^{-1} Hb\}\}\right].$$

The new metric ($D_{new}$) can be used in the demodulation unit 210 to search for the best candidate symbol estimates $\hat{c}^{[i]}$. In a sense, the new metric is a measurement of how accurate candidate symbols $\bar{c}^{[i]}$ model the transmitted symbols. The smaller the value of the new metric, the "closer" the candidate symbols are to the transmitted symbols, and the more likely the candidate symbols represent the best estimates of the transmitted symbols. The best candidate symbol estimates $\hat{c}^{[i]}$ minimize the new metric and most likely represent the transmitted symbols. The demodulation unit 210 searches over all $(q^{[i]})^N$ candidates $\bar{c}^{[i]}$ in the effective constellation $(Q^{[i]})^N$ for the best candidates that minimize the new metric $D_{new}(\bar{c}^{[i]}|r^{[i-1]},R)$ and outputs the best candidates as the decision $\hat{c}^{[i]}$.

Inclusion of the correction term in Equation (1.16) (i.e. the last term in Equation 1.16) provides a more accurate model of the unresolved signals, but also increases the complexity of the demodulation unit 210. The correction term in Equation (1.16) contains information regarding the mismatch between two models of the unresolved signals, a Gaussian noise model and a model representing the unresolved signals as a finite set. Such mismatch is more pronounced when the size of $O^{[i]}$ is small. Therefore, when the size of $O^{[i]}$ is small, the inclusion of the correction term in Equation (1.16) boosts the performance of the demodulator 210. On the other hand, when the size of $O^{[i]}$ is large, the mismatch between these two models becomes less significant and the inclusion of the correction term in Equation (1.16) is less critical. Equally notable is that the complexity of the correction term is proportional to $(o^{[i]})^N$ where $o^{[i]}$ is the size of $O^{[i]}$ and N is the number of signal streams in the MIMO receiver. It is therefore desirable to take into account the correction term in Equation (1.16) at stage i when $o^{[i]}$ is small. As an illustration, in the examples shown in FIGS. 4-5, the correction term may be included at stage 2 where the size of the subset constellation $O^{[1]}$ is 4. At stage 1, however, the size of the subset constellation $O^{[1]}$ is 9. The benefit of improved accuracy by including the correction term in the calculation of the metrics does not outweigh the increased complexity. As such, the correction term may be ignored at stage 1.

Other simplifications can be also implemented when calculating the correction term of Equation (1.16). For example, the probability distribution of $b^{[i]}$ may be assumed uniform in the effective constellation $(O^{[i]})^N$. Specifically:

$$\rho_{b^{[i]}} \equiv 1/(o^{[i]})^N \quad (1.18).$$

The correction term $\Delta(\bar{c}^{[i]}|r^{[i-1]},R)$ can then be simplified as:

$$\Delta(\bar{c}^{[i]}|r^{[i-1]}, R) = \\ -\ln\left[\sum_{b \in (O^{[i]})^N} e^{-b^H H^H R^{-1} Hb} \exp\{2\operatorname{Re}\{(r^{[i-1]} - H\bar{c}^{[i]})^H R^{-1} Hb\}\}\right] + \\ N\ln(o^{[i]}). \quad (1.19)$$

The second term in the above expression is constant and can be ignored.

Furthermore, in cases where $O^{[i]}$ is a QAM constellation, the correction term $\Delta(\bar{c}^{[i]}|r^{[i-1]},R)$ can be simplified as:

$$\Delta(\bar{c}^{[i]}|r^{[i-1]}, R) = \\ -\ln\left[\sum_{b \in (O^{[i]})^N : b_i \in A^{[i]}} e^{-b^H H^H R^{-1} Hb} \\ \begin{bmatrix} \cosh\{2\operatorname{Re}\{(r^{[i-1]} - Hc)^H R^{-1} Hb\}\} \\ \cosh\{2\operatorname{Im}\{(r^{[i-1]} - Hc)^H R^{-1} Hb\}\} \end{bmatrix}\right] + \ln 2. \quad (1.20)$$

Here function $\cos h()$ is the hyperbolic cosine function and $A^{[i]}$ is the first quadrant of the complex plane excluding the imaginary axis. $A^{[i]}$ can be defined as:

$$A^{[i]} \equiv \{x \in \square : \operatorname{Re}\{x\} > 0 \text{ and } \operatorname{Im}\{x\} \geq 0\} \quad (1.21).$$

Equation (1.20) follows from the property of QAM constellations, that is, in any QAM constellation, it is true that:

$$o^{[i]} = jo^{[i]} \quad (1.22),$$

which in turn implies that $O^{[i]} = -O^{[i]}$. Again in Equation (1.20), the second term is constant and can be ignored.

Figure 6:
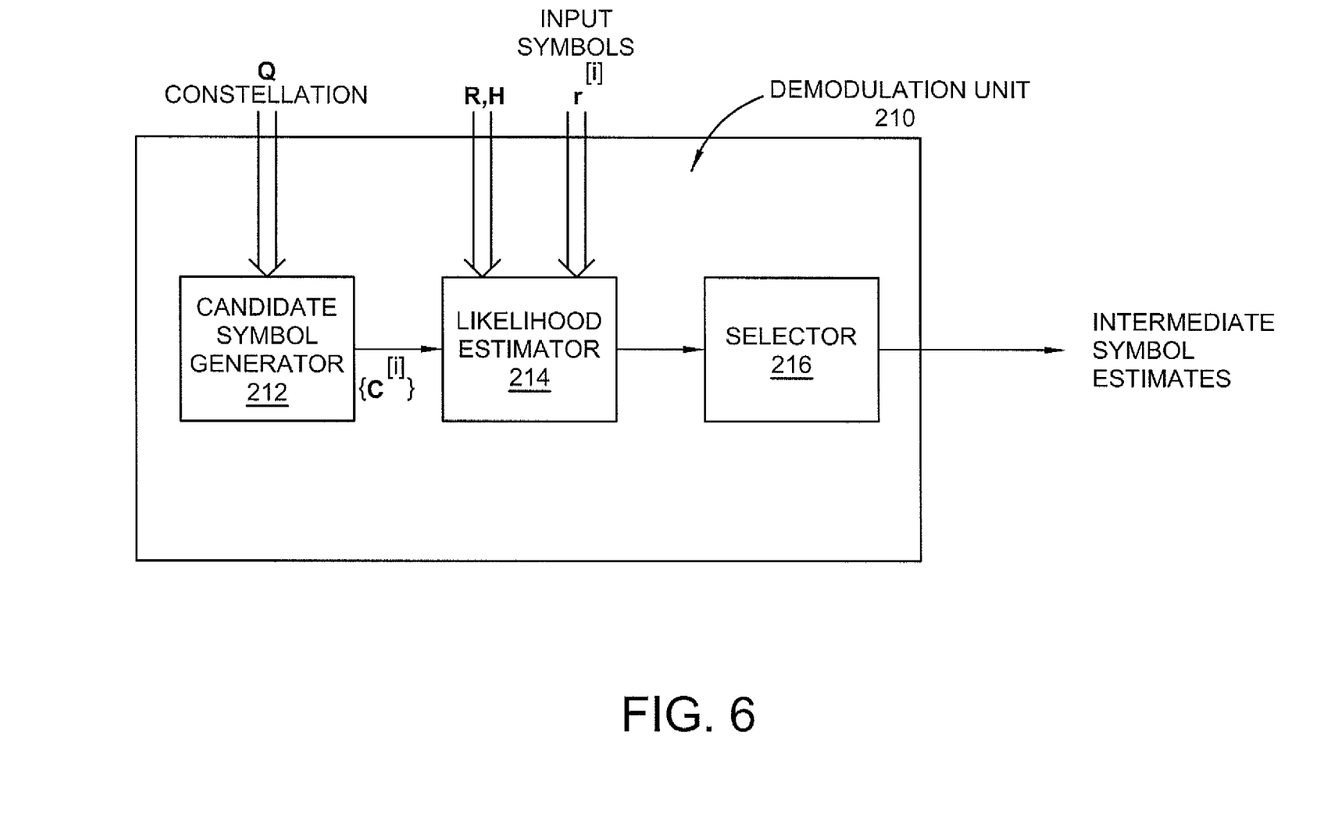
FIG. 6 illustrates an exemplary embodiment of a multi-stage SLI demodulator.

FIG. 6 depicts a demodulation unit 210. The demodulation unit 210 in FIG. 6 comprises three components: a candidate symbol generator 212, a likelihood estimator 214, and a selector 216. The candidate symbol generator 212 receives symbol constellation $(Q^{[i]})^N$ as an input and generates a set of candidate sequences from the symbols contained in the constellation $(Q^{[i]})^N$. From the generated set of candidate sequences, the set of unresolved signals can be computed. For each candidate sequence, the likelihood estimator 214 calculates how likely it represents the transmitted symbols. Such likelihood may be computed based on the input symbols $r^{[i]}$, noise covariance R, channel responses H, and a probability mass function for the unresolved signals $\rho_{b^{[i]}}(b)$. The results from the likelihood estimator 214 are fed into the selector 216, which selects and outputs the best candidates as the intermediate estimates, $\hat{c}^{[i]}$.

Figure 7:
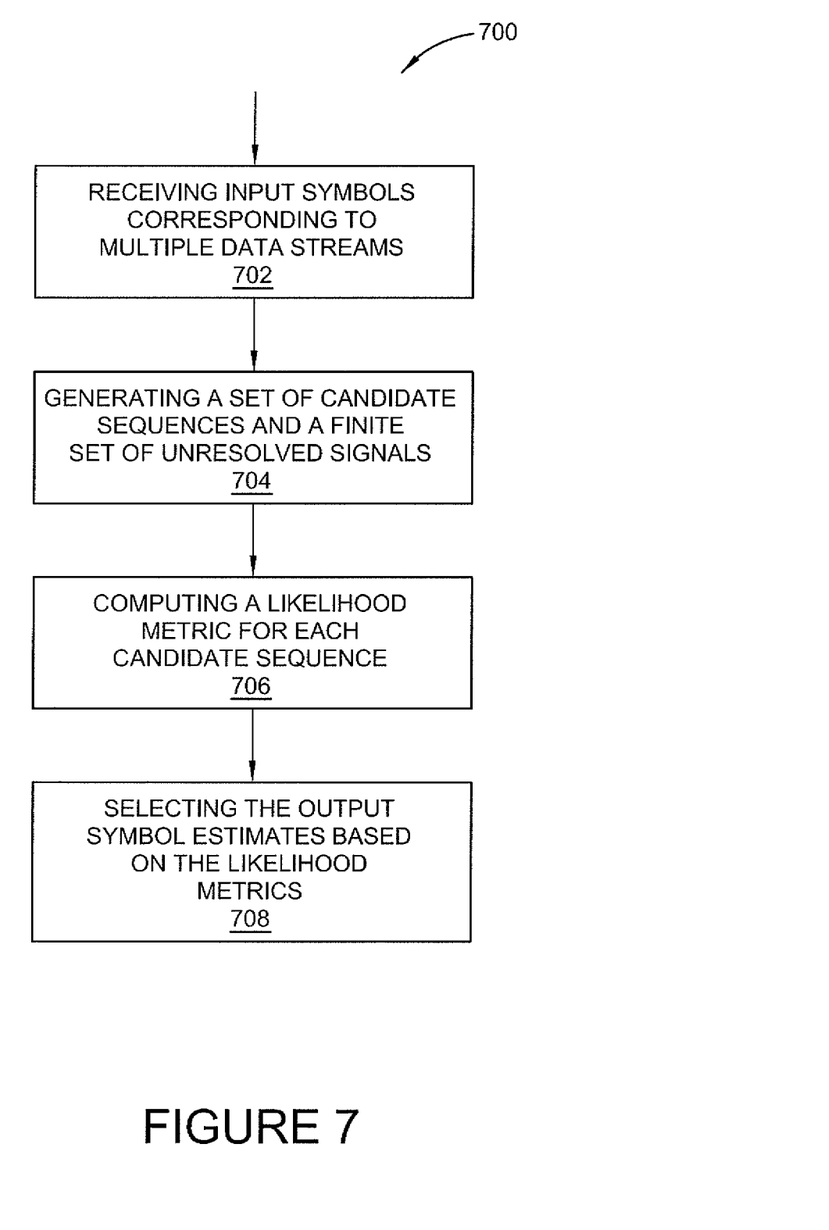
FIG. 7 illustrates a flow chart of demodulating a MIMO signal at a multi-stage SLI demodulator using a corrected metric.

FIG. 7 is a flow chart illustrating an exemplary demodulation process 700 performed by the demodulation unit 210. The demodulation unit 210 receives input symbols that correspond to multiple data streams (step 702). Based on the input symbols, the demodulator 210 generates a set of candidate sequences and a set of unresolved signals (step 704). For each candidate sequence, the demodulator 210 computes a likelihood metric that represents how likely this candidate sequence represents the transmitted symbols (step 706) and selects the best candidate as the output symbol estimates based on the likelihood metrics calculated for all the candidate sequences (step 708). Note that the sets of candidate sequences and the sets of unresolved signals may be alternatively pre-computed and stored for use in the demodulator.

The present invention may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

The invention claimed is:

1. A method of demodulating multiple data streams implemented in one demodulation stage of a multi-stage receiver, said method comprising:
   receiving input symbols corresponding to multiple data streams;
   generating a set of candidate sequences from symbols in a symbol constellation, and a finite set of unresolved signals obtained by modulating the set of candidate sequences and subtracting the modulated candidate sequences from the input symbols;

computing a likelihood metric for each candidate sequence based on the input symbols and a probability mass function for the unresolved signals; and selecting, based on the likelihood metrics, one of said candidate sequences as output symbol estimates to be summed with output symbol estimates from one or more other demodulation stages to generate final estimates of the multiple data streams.

2. The method of claim 1, wherein computing a likelihood metric for each candidate sequence comprises computing a sum of a squared Euclidean distance and a correction term that includes the probability mass function for the unresolved signals.

3. The method of claim 1, wherein computing a likelihood metric comprises:

determining a number of the unresolved signals in the finite set of unresolved signals; and when the number of the unresolved signals is less than a threshold, computing the likelihood metric as a sum of a squared Euclidean distance metric and a correction term that includes the probability mass function for the unresolved signals.

4. The method of claim 3, wherein the correction term is ignored in the computation of the likelihood metric when the number of the unresolved signals is greater than the threshold.

5. The method of claim 1, wherein the probability mass function for the unresolved signal is a uniform distribution.

6. The method of claim 3, wherein the correction term is computed according to:

$$\Delta(\overline{c}^{[i]} \mid r^{[i-1]}, R) = -\ln\left[\sum_{b \in (O^{[i]})^N : b_j \in A^{[i]}} e^{-b^H H^H R^{-1} Hb} \left[\begin{array}{c} \cosh\{2\mathrm{Re}\{(r^{[i-1]} - Hc)^H R^{-1} Hb\}\} \\ \cosh\{2\mathrm{Im}\{(r^{[i-1]} - Hc)^H R^{-1} Hb\}\} \end{array}\right]\right]$$

when the probability mass function for the unresolved signal is a uniform distribution, and the symbol constellation is a QAM constellation in which the symmetric property holds $O^{[i]} = jO^{[i]}$.

7. The method of claim 1, wherein computing a likelihood metric for each candidate sequence based on the input symbols and a probability mass function for the unresolved signal comprises computing a convolution of the probability mass function of the unresolved signal and a probability mass function of Gaussian noise.

8. The method of claim 1, wherein selecting, based on the likelihood metrics, one of said candidate sequences as output symbol estimates comprises selecting a candidate sequence that produces the lowest value of the likelihood metric as the output symbol estimates.

9. The method of claim 1, further comprising:
modulating the output symbol estimates; and
removing the modulated output symbol estimates from the input symbols to generate input symbols for a subsequent demodulation stage of the multi-stage receiver.

10. The method of claim 1, further comprising combining the output symbol estimates from each stage to form final symbol estimates.

11. A demodulator for a multi-stage receiver having a plurality of demodulation stages, said demodulator comprising:

an input to receive input symbols corresponding to multiple data streams and a symbol constellation;

a candidate symbol generator to generate a set of candidate sequences from symbols in said symbol constellation, and to generate a finite set of unresolved signals obtained by modulating the set of candidate sequences and subtracting the modulated candidate sequences from the input symbols;

a likelihood estimator to compute a likelihood metric for each candidate sequence based on the input symbols and a probability mass function for the unresolved signals; and a selector to select one of said candidate sequences based on the likelihood metrics computed for the set of candidate sequences as output symbol estimates to be summed with output symbol estimates from one or more other demodulation stages to generate final estimates of the multiple data streams.

12. The demodulator of claim 11, wherein the likelihood estimator is configured to compute a likelihood metric for each candidate sequence by computing a sum of a squared Euclidean distance metric and a correction term that includes the probability mass function for the unresolved signals.

13. The demodulator of claim 11, wherein the likelihood estimator is configured to:

determine a number of the unresolved signals in the finite set of unresolved signals; and when the number of the unresolved signals is less than a threshold, compute the likelihood metric as a sum of a squared Euclidean distance metric and a correction term that includes the probability mass function for the unresolved signals.

14. The demodulator of claim 13, wherein the likelihood estimator is configured to ignore the correction term in the computation of the likelihood metric when the number of the unresolved signals is greater than the threshold.

15. The demodulator of claim 11, wherein the probability mass function for the unresolved signals is a uniform distribution function.

16. The method of claim 13, wherein the the likelihood estimator is configured to compute the correction term according to:

$$\Delta(\overline{c}^{[i]} \mid r^{[i-1]}, R) = -\ln\left[\sum_{b \in (O^{[i]})^N : b_j \in A^{[i]}} e^{-b^H H^H R^{-1} Hb} \left[\begin{array}{c} \cosh\{2\mathrm{Re}\{(r^{[i-1]} - Hc)^H R^{-1} Hb\}\} \\ \cosh\{2\mathrm{Im}\{(r^{[i-1]} - Hc)^H R^{-1} Hb\}\} \end{array}\right]\right]$$

when the probability mass function for the unresolved signal is a uniform distribution, and the symbol constellation is an QAM constellation in which the symmetric property holds $O^{[i]} = jO^{[i]}$.

17. The demodulator of claim 11, wherein the likelihood metric computed by the likelihood estimator for each candidate sequence is derived from a convolution of the probability mass function of the unresolved signals and a noise probability density function.

18. The demodulator of claim 11, wherein the candidate sequence selected by the selector produces a lowest likelihood metric.

19. The demodulator of claim 11, further comprising, at each stage, a modulator for modulating the output symbol estimates, and a subtractor for removing the modulated output symbol estimates from the input symbols to generate input symbols for a subsequent demodulation stage of the demodulator.

20. The demodulator of claim 11, further comprising a combiner for combining the output symbol estimates from each stage to form final symbol estimates.

* * * * *

UNITED STATES PATENT AND TRADEMARK OFFICE
CERTIFICATE OF CORRECTION

PATENT NO. : 8,798,215 B2  
APPLICATION NO. : 13/306232  
DATED : August 5, 2014  
INVENTOR(S) : Khayrallah et al.

Page 1 of 1

It is certified that error appears in the above-identified patent and that said Letters Patent is hereby corrected as shown below:

In the Specification

In Column 4, Line 5, delete "$\hat{c}=(\hat{c}_1, \ldots \hat{c}_N)^T$." and insert -- $\hat{c} = (\hat{c}_1,\ldots, \hat{c}_N)^T$. --, therefor.

In Column 4, Line 15, delete "$\hat{c}^{[i]}$ am" and insert -- $\hat{c}^{[i]}$ --, therefor.

In Column 4, Line 54, delete "$\hat{c}^{[1]} \ldots \hat{c}^{[i-1]}$," and insert -- $\hat{c}^{[1]},\ldots, \hat{c}^{[i-1]}$, --, therefor.

In Column 5, Line 47, delete "$r^{[i-1]} = Hc^{[i]} + \underline{(Hb[i] + n)}_{v^{[i]}}$," and insert -- $\mathbf{r}^{[i-1]} = \mathbf{H}\mathbf{c}^{[i]} + \underbrace{(\mathbf{H}\mathbf{b}^{[i]} + \mathbf{n})}_{\mathbf{v}^{[i]}}$, --, therefor.

In Column 7, Line 65, delete "cos h()" and insert -- cosh() --, therefor.

In the Claims

In Column 10, Line 38, in Claim 16, delete "method of claim 13, wherein the the" and insert -- demodulator of claim 13, wherein the --, therefor.

Signed and Sealed this  
Twenty-sixth Day of May, 2015

Michelle K. Lee  
*Director of the United States Patent and Trademark Office*